United States Patent
Ishii et al.

(10) Patent No.: US 8,803,984 B2
(45) Date of Patent: Aug. 12, 2014

(54) IMAGE PROCESSING DEVICE AND METHOD FOR PRODUCING A RESTORED IMAGE USING A CANDIDATE POINT SPREAD FUNCTION

(75) Inventors: Yasunori Ishii, Osaka (JP); Yusuke Monobe, Kyoto (JP)

(73) Assignee: Dolby International AB, Amsterdam Zuidoost (NL)

( * ) Notice: Subject to any disclaimer, the term of this patent is extended or adjusted under 35 U.S.C. 154(b) by 263 days.

(21) Appl. No.: 13/264,461

(22) PCT Filed: Jan. 28, 2011

(86) PCT No.: PCT/JP2011/000470
§ 371 (c)(1),
(2), (4) Date: Oct. 14, 2011

(87) PCT Pub. No.: WO2011/099244
PCT Pub. Date: Aug. 18, 2011

(65) Prior Publication Data
US 2012/0105655 A1    May 3, 2012

(30) Foreign Application Priority Data
Feb. 10, 2010   (JP) ................. 2010-027901

(51) Int. Cl.
*H04N 5/228*    (2006.01)
*G06K 9/36*    (2006.01)
(52) U.S. Cl.
USPC ..................... 348/208.4; 382/282
(58) Field of Classification Search
USPC ........ 382/195, 225, 282, 321, 255; 348/208.4
See application file for complete search history.

(56) References Cited

U.S. PATENT DOCUMENTS

2006/0093233 A1   5/2006  Kano et al.
2007/0258706 A1  11/2007  Raskar et al.
(Continued)

FOREIGN PATENT DOCUMENTS

CN   101291391 A   10/2008
JP   2006-129236 A   5/2006
(Continued)

OTHER PUBLICATIONS

International Search Report for corresponding International Application No. PCT/JP2011/000470 mailed Mar. 8, 2011.

(Continued)

*Primary Examiner* — Mekonnen Dagnew
(74) *Attorney, Agent, or Firm* — Renner, Otto, Boisselle & Sklar, LLP

(57) ABSTRACT

An image processing device extracts, in an image block selection section 226, a plurality of image block pairs from a degraded image and a provisional restored image, each of the image block pairs being formed by two image blocks at identical coordinates in the degraded image and the provisional restored image, and estimates a point spread function (PSF) for each of the image block pairs. From among the estimated PSFs, a PSF which is estimated to be close to a true PSF is selected as a candidate PSF. The estimation of the PSF is carried out on a block-by-block basis, whereby the amount of computation required for the estimation of the PSF can be reduced. Also, the estimation method used is not disturbed by an image block which includes noise, and therefore, a PSF which is close to the true PSF can be estimated.

14 Claims, 10 Drawing Sheets

(56) References Cited

U.S. PATENT DOCUMENTS

| | | | |
|---|---|---|---|
| 2007/0286517 | A1 | 12/2007 | Paik et al. |
| 2008/0170124 | A1 | 7/2008 | Hatanaka et al. |
| 2008/0232707 | A1* | 9/2008 | Lee et al. .................. 382/255 |
| 2009/0086174 | A1* | 4/2009 | Fukumoto et al. ............ 355/29 |
| 2009/0110303 | A1* | 4/2009 | Nishiyama et al. .......... 382/225 |
| 2011/0090352 | A1* | 4/2011 | Wang et al. ............... 348/208.6 |
| 2011/0097009 | A1* | 4/2011 | Chouly ....................... 382/260 |

FOREIGN PATENT DOCUMENTS

| | | | |
|---|---|---|---|
| JP | 2008-092515 | A | 4/2008 |
| JP | 2009-135561 | A | 6/2009 |
| JP | 2009-522825 | T2 | 6/2009 |
| JP | 2009-244944 | A | 10/2009 |

OTHER PUBLICATIONS

Shan et al., "High-quality Motion Deblurring from a Single Image", SIGGRAPH 2008.

Yoneji et al., "PSF Parameter Estimation for Restoration of Linear Motion Blurred Image", Study Report to Information Processing Society of Japan, vol. 2005, No. 38, pp. 47-52, 2005.

Tanaka et al., "Motion Blur parameter Identification from a Linearly Blurred Image", IEEE 2007.

Bioucas-Dias et al., "Bayesian Wavelet-Based Image Deconvolution: A GEM Algorithm Exploiting a Class of Heavy-Tailed Priors", IEEE Trans. Image Proc., vol. 15, No. 4, pp. 937-951, Apr. 2006.

Anat Levin, "Blind Motion Deblurring Using Image Statistics", Advances in Neural Information Processing Systems (NIPS), Dec. 2006.

Fergus et al., "Removing Camera Shake from a Single Photograph", SIGGRAPH 2006.

Chinese Office Action for corresponding Chinese Application No. 201180001729.5 dated May 14, 2014 and partial English translation.

* cited by examiner

POINT IMAGE IN IDEAL IMAGE

IMAGE IN DEGRADED IMAGE (a)

PSF1 (f1)    PSF2 (f2)    PSF3 (f3)

(b)

CLUSTER 1    CLUSTER 2

CLUSTER 3

(c)

CLUSTER 1    CLUSTER 2

REPRESENTATIVE PSF (fs1)    REPRESENTATIVE PSF (fs2)

IMAGE PROCESSING DEVICE AND METHOD FOR PRODUCING A RESTORED IMAGE USING A CANDIDATE POINT SPREAD FUNCTION

TECHNICAL FIELD

The present invention relates to an image processing device and method for restoring an image, and an image capture device which includes the image processing device.

BACKGROUND ART

In the case of capturing an image by a digital camera, noise may sometimes be added to the image due to the characteristics of a CCD (Charge-Coupled Device) or a readout circuit for CMOS or the characteristics of transmission paths. Also, blur of an image due to an out-of-focus condition in capturing of the image or blur of an image due to camera shake occurs. In this way, the captured image has blur which is attributed to user's handling of the camera in photographing in addition to the noise which is attributed to the specific characteristics of the captured image, so that the image is degraded. Among such "blur" types, blur of an image which is attributed to a motion of a camera during photographing (exposure) is herein referred to as "motion blur", so that it is distinguishable from blur that is attributed to an out-of-focus condition (out-of-focus blur).

In recent years, especially, demand for high sensitive photography is increasing, and therefore, it is necessary to restore an image degraded by blur (hereinafter, "degraded image") to an image which is as close to an original image (hereinafter, "ideal image") as possible. To realize a bright image which is free from noise or blur, such as an image demanded in high sensitive photography, the solutions are generally divided into two ideas, increasing the sensitivity and extending the exposure time.

However, increasing the sensitivity disadvantageously leads to amplification of noise. As a result, a signal is buried in the noise so that, in many cases, large part of a resultant image is formed by the noise. On the other hand, extending the exposure time enables accumulation of a larger amount of light which occurs at that site, resulting in an image which includes smaller noise. In this case, a signal would not be buried in the noise, but there is a problem of generation of motion blur in an image due to camera shake.

According to the prior art, there are two countermeasures against the problem resulting from the extended exposure time. One is optical camera shake compensation, such as lens shift, sensor shift, or the like. The other one is obtaining the direction/magnitude of motion blur from a resultant image and performing signal processing based on the obtained direction/magnitude of the blur to restore the image (a restoration method based on signal processing). The restoration method based on signal processing is, for example, disclosed in Patent Document 1, Patent Document 2, and Non-patent Documents 1 to 5.

A phenomenon that an image is degraded due to camera shake, from an ideal image to a degraded image, can be modeled as described below. A function which represents the brightness of each pixel of the degraded image is thought to be obtained by convolution of a function that represents the brightness of each pixel in the ideal image and a point spread function (PSF) that represents blur of an image which is caused by camera shake during photographing of the image. Restoration of the ideal image based on the obtained degraded image is realized by deconvolution of the degraded image and the PSF. A convolution operation is a multiplication in the frequency space. Therefore, in the frequency space, the degraded image is divided by the PSF, whereby the restored image can be obtained.

Thus, when the PSF is known, the restored image can be obtained relatively readily by means of the above-described deconvolution so long as the effect of noise is neglected. On the other hand, when the PSF is unknown, it is necessary to estimate the PSF from the degraded image in order to obtain a restored image. Estimation of the PSF may be realized by, for example, a method based on the sparse coding concept which is disclosed in Non-patent Document 1.

According to this method, in the first place, a first restoration result is obtained from a manually-given initial PSF and a degraded image. Then, the first restoration result and the degraded image are used to estimate a PSF which is close to a true PSF. The initial PSF is amended with the estimated PSF. The amended PSF is used to obtain the second restoration result based on the degraded image. Subsequently, the step of obtaining the $N^{th}$ restored image from the $(N-1)^{th}$ PSF and the degraded image and the step of estimating the $N^{th}$ PSF from the $N^{th}$ restored image and the degraded image are repeated, whereby a PSF estimation process and a restoration process performed on the degraded image are concurrently advanced.

CITATION LIST

Patent Literature

Patent Document 1: Japanese Laid-Open Patent Publication No. 2006-129236
Patent Document 2: Japanese PCT National Phase Laid-Open Publication No. 2009-522825
Patent Document 3: Japanese Laid-Open Patent Publication No. 2008-092515

Non-Patent Literature

Non-patent Document 1: "High-quality Motion Deblurring from a Single Image", Qi Shan, Jiaya Jia, and Aseem Agarwala, SIGGRAPH 2008
Non-patent Document 2: Yoneji, Tanaka and Okutomi, "psf Parameter Estimation Method for Linearly Blurred Image Restoration", Study Report to Information Processing Society of Japan, Vol. 2005, No. 38, pp. 47-52, 2005
Non-patent Document 3: J. Bioucas-Dias, "Bayesian wavelet-based image deconvolution: a gem algorithm exploiting a class of heavy-tailed priors", IEEE Trans. Image Proc., vol. 4, pp. 937-951, April 2006
Non-patent Document 4: Levin, "Blind Motion Deblurring Using Image Statistics", Advances in Neural Information Processing Systems (NIPS), December 2006
Non-patent Document 5: Bob Fergus et al., "Removing camera shake from a single image", Barun Singh Aaron Hertzmann, SIGGRAPH 2006

SUMMARY OF INVENTION

Technical Problem

Extending the exposure time for the purpose of collecting a sufficient amount of light in a dark environment increases the probability of occurrence of camera shake. To avoid motion blur by means of optical camera shake compensation in such a dark environment, it is necessary to extend the effective range of a lens or a sensor. However, there is a problem that, when the effective range is increased, a time delay occurs in moving the lens or the like. Also, increasing the effective range encounters a physical limit. Therefore, the optical camera shake compensation has a limit.

On the other hand, according to a prior-art restoration method which is based on signal processing, estimation of the PSF and restoration of an image are performed based on data from the entire image. Therefore, the amount of computation and the amount of memory space required for the processing are disadvantageously large. In general, where the number of pixels which form an image is n, the amount of computation required and the amount of memory space required are expressed by $O(n^2)$. Therefore, to restore an image which is formed by a large number of pixels, a large amount of computational resources are necessary. When an image includes noise, motion blur of a subject, or the like, performing a restoration process with the use of an entire image causes an error in estimation of the PSF, so that estimation of a PSF which is closer to the true PSF is difficult.

Patent Document 3 discloses the technique of reducing the amount of computation which is required for extracting a major subject included in an image. According to this technique, an image is divided into a plurality of local regions, and the process is switched depending on whether or not the major subject is included in each local region. However, the technique disclosed in Patent Document 3 cannot be applied to restoration of an image. In order to repair an image which includes motion blur, it is necessary to perform the same restoration process on every one of the local regions. In other words, even when an image is divided into a plurality of local regions, the local regions need a restoration process with the same PSF.

The present invention was conceived in view of the above problems. With the knowledge that the size of the degraded image and the size of the restored image are immoderately larger than the size of the PSF, using the minimum necessary amount of data for the estimation enables reduction of the amount of computation while the accuracy is maintained. One of the objects of the present invention is to provide an image processing device and method in which the amount of computation for the PSF estimation is reduced while the accuracy of restoration is maintained, and an image capture device which includes the image processing device.

Solution to Problem

An image processing device of the present invention is an image processing device for producing a restored image from an input degraded image, the restored image having smaller blur than the degraded image, the device including: an initial image setting section for setting a provisional restored image; an image block selection section for selecting a plurality of image block pairs from the degraded image and the provisional restored image, each of the image block pairs being formed by two image blocks at identical coordinates in the degraded image and the provisional restored image; a PSF estimation section for obtaining a plurality of point spread functions respectively corresponding to the plurality of image block pairs; a PSF selection section for selecting a candidate point spread function which defines blur of the degraded image from among the plurality of point spread functions obtained in PSF estimation section; and an image restoration section for producing a restored image from the degraded image using the candidate point spread function.

In one embodiment, the image processing device of the present invention further includes an initial PSF setting section for setting a provisional point spread function. The initial image setting section produces the provisional restored image from the degraded image using the provisional point spread function.

In one embodiment, where a horizontal direction and a vertical direction of the degraded image and the provisional restored image are respectively referred to as an X direction and a Y direction, each of a size along the X direction and a size along the Y direction of each of image blocks included in the plurality of image block pairs is equal to a larger one of a size along the X direction and a size along the Y direction of a region formed by pixels in which the provisional point spread function has a finite value.

In one embodiment, the image block selection section randomly selects the plurality of image block pairs from the degraded image and the provisional restored image.

In one embodiment, where n=1, 2, ..., N (N is an integer not less than 2), the provisional restored image is an $n^{th}$ provisional restored image, and the restored image is an $n^{th}$ restored image, after production of the $n^{th}$ restored image, the initial image setting section updates the $n^{th}$ provisional restored image with the $n^{th}$ restored image, the updated restored image being used as a $(n+1)^{th}$ provisional restored image, and the image block selection section selects, from the degraded image and the $(n+1)^{th}$ provisional restored image, a plurality of image block pairs at least some of which are different from the plurality of image block pairs, whereby updating of the candidate point spread function and the restored image is repeated.

In one embodiment, the image block selection section selects, as a first image block group, a plurality of image blocks from the degraded image independently of the selection of the plurality of image block pairs, and the PSF selection section selects the candidate point spread function based on a difference between $(s_{kb}*f_k)$ and $i_b$, $(s_{kb}*f_k)$ being a function obtained by convolution of $s_{kb}$ and $f_k$, where $f_k$ is a $k^{th}$ point spread function among the plurality of point spread functions obtained by the PSF estimation section (k is an integer not less than 1), $i_b$ is a function which represents a brightness distribution in a $b^{th}$ one of the image blocks included in the first image block group (b is an integer not less than 1), and $s_{kb}$ is a function obtained by deconvolution of $i_b$ and $f_k$.

In one embodiment, the PSF selection section calculates, for each of the plurality of point spread functions, a number of image blocks in which a square error between $(s_{kb}*f_k)$ and $i_b$ is not more than a predetermined threshold and selects one of the point spread functions for which the calculated number of the image blocks is the largest as the candidate point spread function.

In one embodiment, the image block selection section selects, independently of the selection of the plurality of image block pairs, a plurality of image blocks from the degraded image as a first image block group and a plurality of image blocks from the provisional restored image as a second image block group, the image blocks of the second image block group being at coordinates identical to those of the image blocks included in the first image block group, and the PSF selection section selects the candidate point spread function based on a difference between $(s_b*f_k)$ and $i_b$, $(s_b*f_k)$ being a function obtained by convolution of $s_b$ and $f_k$, where $f_k$ is a $k^{th}$ point spread function among the plurality of point spread functions obtained by the PSF estimation section (k is an integer not less than 1), $i_b$ is a function which represents a brightness distribution in a $b^{th}$ one of the image blocks included in the first image block group (b is an integer not less than 1), and $s_b$ is a function which represents a brightness distribution in one of the image blocks included in the second image block group corresponding to the $i_b$ (b is an integer not less than 1).

In one embodiment, the PSF selection section calculates, for each of the plurality of point spread functions, a number of image blocks in which a square error between $(s_b*f_k)$ and $i_b$ is not more than a predetermined threshold and selects one of the point spread functions for which the calculated number of the image blocks is the largest as the candidate point spread function.

In one embodiment, the image block selection section randomly selects the first image block group from the degraded image.

In one embodiment, the PSF selection section performs following processes: sorting the plurality of point spread functions obtained by the PSF estimation section into a plurality of clusters, each of the clusters being formed by a plurality of point spread functions which are similar to one another, determining an average point spread function in each of the plurality of clusters as a representative PSF of the cluster, selecting a candidate representative PSF from among the plurality of determined representative PSFs, and selecting the candidate point spread function from one of the clusters corresponding to the candidate representative PSF.

An image capture device of the present invention includes: an image processing device of the present invention; and a solid-state image sensor, wherein a signal obtained by the solid-state image sensor is input as the degraded image to the image processing device.

An image processing method of the present invention is a method of producing a restored image from an input degraded image, the restored image having smaller blur than the degraded image, the method comprising the steps of: (A) setting an $n^{th}$ restored image where n=1, 2, . . . , N (N is an integer not less than 2); (B) selecting a plurality of image block pairs from the degraded image and the $n^{th}$ restored image, each of the image block pairs being formed by two image blocks at identical coordinates in the degraded image and the $n^{th}$ restored image; (C) obtaining a plurality of point spread functions respectively corresponding to the plurality of image block pairs; (D) selecting a candidate point spread function which defines blur of the degraded image from among the plurality of point spread functions obtained in the PSF estimation section; and (E) producing a $(n+1)^{th}$ restored image from the degraded image using the candidate point spread function, wherein respective ones of steps (A) to (E) are started from n=1 and repeated till a $N+1^{th}$ restored image is produced.

A program of the present invention is a program for controlling an operation of an image processing device that is configured to repeatedly perform a restoration process based on an input degraded image to produce a restored image, the restored image having smaller blur than the degraded image, the program comprising the steps of: (A) setting an $n^{th}$ restored image where n=1, 2, . . . , N (N is an integer not less than 2); (B) selecting a plurality of image block pairs from the degraded image and the $n^{th}$ restored image, each of the image block pairs being formed by two image blocks at identical coordinates in the degraded image and the $n^{th}$ restored image; (C) obtaining a plurality of point spread functions respectively corresponding to the plurality of image block pairs; (D) selecting a candidate point spread function which defines blur of the degraded image from among the plurality of point spread functions obtained in the PSF estimation section; and (E) producing a $(n+1)^{th}$ restored image from the degraded image using the candidate point spread function, wherein the program instructs the image processing device to perform a process of starting respective ones of steps (A) to (E) from n=1 and repeating steps (A) to (E) till a $N+1^{th}$ restored image is produced.

The program of the present invention may be stored in a computer-readable storage medium.

Advantageous Effects of Invention

According to the present invention, in a system for performing a restoration process on a degraded image by means of PSF estimation, the amount of computation and the amount of memory space can be reduced.

DESCRIPTION OF EMBODIMENTS

Prior to the description of embodiments of the present invention, the basic principle of the present invention is described.

Figure 1:
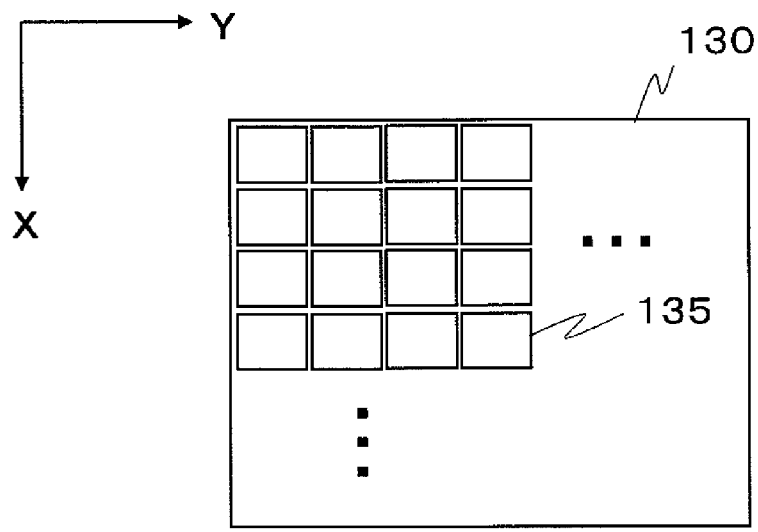
FIG. 1 is a diagram showing a pixel arrangement of an image.

FIG. 1 is a diagram schematically showing a structure of an image in this specification. In this specification, a function which represents a degraded image is expressed by i(x,y). The coordinates (x,y) are two-dimensional coordinates which are indicative of the position of a pixel in an image. In the case of an image 130 formed by, for example, M×N pixels 135 which are arranged in rows and columns, assuming that x and y are integers which satisfy the relationships of $0 \leq x \leq M-1$ and $0 \leq y \leq N-1$, respectively, the position of each one of the pixels that form the image can be specified by the coordinates (x,y). Here, it is assumed that the origin of the coordinate system, (0,0), is at the left upper corner of the image. The X axis extends in a vertical direction. The Y axis extends in a horizontal direction. Note that the arrangement of the coordinates is arbitrary. i(x,y) represents the brightness at a position indicated by coordinates (x,y) on the degraded image. In this specification, the brightness at a position indicated by coordinates (x,y) on an image is sometimes referred to as "pixel value".

Figure 2:
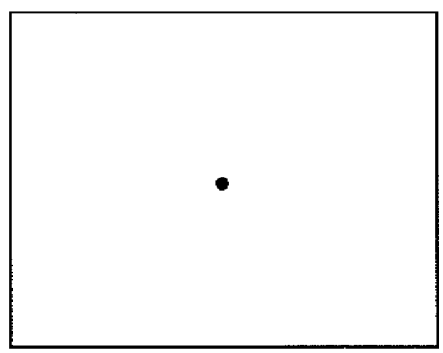
FIG. 2 is a diagram which illustrates the difference between a point image in an ideal image and an image in a degraded image.
Figure 2:
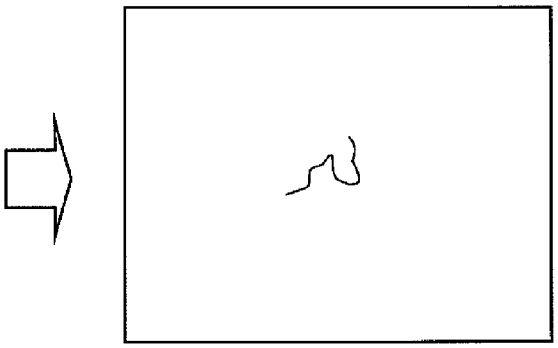

In the description provided below, it is assumed that a degraded image i(x,y) occurs due to camera shake, and "motion blur" means blur caused by camera shake. The brightness distribution of an unblurred image (ideal image) is s(x,y). The point spread function (PSF) which defines blur is f(x,y). f(x,y) is determined depending on the trajectory of a camera during exposure. As the camera moves during exposure, an image in one of the pixels included in an ideal image (point image) corresponds to an image extending over a plurality of neighboring pixels in a degraded image. FIG. 2 shows an example where a point image in an ideal image corresponds to a blurred image in a degraded image. If such blur occurs equally among all of point images, i.e., shift-invaliant, it can be said that, f(x,y) is a function which represents with what weighting the point image extend over neighboring pixels at positions (x,y) in a relative coordinate system defined around the point image on the origin. In this specification, it is assumed that f(x,y) is a function which has finite values only in the range of $-m \leq x \leq m$ and $-n \leq y \leq n$ (m and n are integers not less than 1). In other words, a range in which a single point image in an ideal image can have blur due to camera shake is included in a rectangular region which has the size of $(2m+1) \times (2n+1)$. When the effect of noise is neglected, i(x,y), s(x,y), and f(x,y) satisfy Eq. 1 shown below:

[Expression 1]

$$i(x,y) = s(x,y) * f(x,y) \quad (1)$$

where symbol "*" means convolution. In general, the right side of Eq. 1 is expressed by Eq. 2 shown below.

[Expression 2]

$$s(x,y) * f(x,y) = \int_{-\infty}^{\infty} \int_{-\infty}^{\infty} s(x-j, y-k) f(j,k) dj dk \quad (2)$$

When f(x,y) is formed by $(2m+1) \times (2n+1)$ pixels, Eq. 2 shown above can be expressed by Eq. 3 shown below.

[Expression 3]

$$s(x,y) * f(x,y) = \frac{1}{m \times n} \sum_{j=-m}^{m} \sum_{k=-n}^{n} s(x-j, y-k) f(j,k) \quad (3)$$

If the function f(x,y) that is the point spread function of blur is known, the unblurred image s(x,y) can be restored by deconvolution of an obtained degraded image i(x,y). If f(x,y) is unknown, it is necessary to estimate f(x,y) from the image before obtaining s(x,y).

In general, the Fourier transform of the convolution of two functions is expressed by the product of the Fourier transforms of the respective functions. Therefore, where the Fourier transforms of i(x,y), s(x,y) and f(x,y) are expressed by I(u,v), S(u,v) and F(u,v), respectively, Eq. 4 shown below is derived from Eq. 1. Note that (u,v) represents the coordinates in a frequency space, which respectively correspond to the spatial frequencies of the x direction and the y direction in a real image.

[Expression 4]

$$I(u,v) = S(u,v) \cdot F(u,v) \quad (4)$$

where symbol "·" means "multiplication" of the functions in the frequency space. Eq. 4 can be deformed to obtain Eq. 5 shown below.

[Expression 5]

$$S(u,v) = \frac{I(u,v)}{F(u,v)} \quad (5)$$

Eq. 5 means that a function obtained by dividing I(u,v), which is the Fourier transform of the degraded image i(x,y), by F(u,v), which is the Fourier transform of the point spread function PSF f(x,y), is equivalent to the Fourier transform S(u,v) of the ideal image s(x,y). In short, if i(x,y) and f(x,y) are determined, S(u,v) will also be determined. Since I(u,v) is the Fourier transform of the degraded image i(x,y), it is possible to restore an image based on the degraded image (to make the degraded image closer to its true image) by means of signal processing so long as f(x,y) that is the point spread function PSF of blur is determined.

According to the present invention, f(x,y) that is the point spread function PSF is determined using a degraded image and an image in the middle of a restoration process (provisional restored image). In the process of determining f(x,y), a plurality of image block pairs are extracted from the degraded image and the provisional restored image, and a PSF is estimated for every one of the image block pairs. These PSFs are obtained according to a known blind-deconvolution method. For some image block pairs, the estimated PSF may be largely different from the true PSF due to inclusion of noise or blur of a subject. Therefore, the estimated PSFs may be functions which are different among the image block pairs. From among these PSFs, a PSF which is estimated to be close to the true PSF is selected as a candidate PSF. The selection of the candidate PSF may be realized by a method which is based on, for example, RANSAC (Random Sample Consensus). According to this method, for every one of the PSFs, the closeness of an image obtained by convolution of the PSF and a provisional restored image to the degraded image is determined. Based on the result of the determination, a PSF which has a large error is omitted, while a PSF which has a small error is selected as the candidate PSF. Thus, PSFs estimated from image block pairs which include noise or blur of a subject are omitted, and a PSF which is close to the true PSF is selected as the candidate PSF. From the selected candidate PSF and the degraded image, a restored image is produced by deconvolution.

Since the estimation of the PSF is not performed on the entirety of the image but on part of the image for each of the image block pairs, it is possible to reduce the amount of computation and the amount of memory space which are required for restoration. Also, a PSF which is close to the true PSF can be selected without being disturbed by local noise or blur of a subject.

Hereinafter, embodiments of the present invention will be described with reference to the drawings. In the descriptions provided below, the same elements are denoted by the same reference marks.

Embodiment 1

Figure 3:
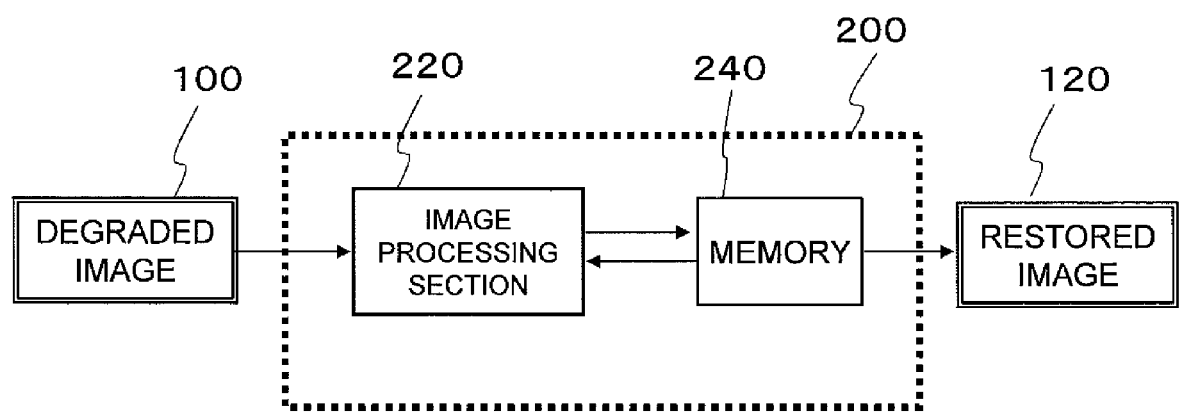
FIG. 3 is a diagram showing a general configuration of an image processing device in the first embodiment of the present invention.

FIG. 3 is a diagram showing a general configuration of an image processing device 200 in the first embodiment of the present invention. The image processing device 200 of the present embodiment repeatedly performs a restoration process based on an input degraded image 100 to produce a restored image 120 that is close to an ideal image. The image processing device 200 includes an image processing section 220 for performing signal processing based on the input degraded image 100 and a memory 240 for storing various data generated in the course of the processing.

The degraded image 100 is data of an image photographed by an image capture device, such as a digital still camera, and includes motion blur which is attributed to camera shake. The image processing section 220 performs a restoration process of the degraded image 100 as well as various signal processing, such as color tone correction, change of resolution, and data compression. The image processing section 220 is preferably realized by a combination of hardware, such as a known digital signal processor (DSP), and software for execution of image processing. The memory 240 may be formed by a DRAM or the like. The memory 240 stores the degraded image 100 and, meanwhile, temporarily stores image data which have undergone various image processing or image data which have been compressed in the image processing section 220. The restored image 120 which is finally produced in the image processing section 220 may be transmitted to another apparatus (not shown) via an unshown wireless or wired communication device.

Hereinafter, the configuration of the image processing section 220 is described with reference to FIG. 4.

The image processing section 220 includes an image input section 250, a PSF determination section 260, and a restoration section 270. The image input section 250 includes an initial PSF setting section 222 for setting a provisional PSF and an initial image setting section 224 for producing a provisional restored image from the degraded image 100 using the provisional PSF. The PSF determination section 260 includes an image block selection section 226 for extracting a plurality of image block pairs from the degraded image and the provisional restored image, a PSF estimation section 228 for estimating a PSF from each of the image block pairs, and a PSF selection section 230 for selecting a candidate PSF from among the plurality of estimated PSFs. The restoration section 270 includes an image restoration section 232 for producing a restored image from the degraded image 100 with the use of the selected candidate PSF and a convergence determination section 234 for determining whether or not the restoration process has been converged. If it is determined that the restoration process has been converged, the convergence determination section 234 outputs a restoration result.

Hereinafter, the respective components are described in more detail.

The initial PSF setting section 222 sets a provisional PSF which is necessary for the image restoration process. The provisional PSF is set based on data that represents the trajectory of a camera during photographing which is detected by, for example, a detection device incorporated in the image capture device used in photographing the degraded image 100, such as a gyro scope or an acceleration sensor. Such data are stored in, for example, the memory 240 or an unshown storage medium and retrieved by the initial PSF setting section 222. The provisional PSF is not necessarily be data detected by that detection device but may be data manually entered by a user. From the viewpoint of reducing the time that is required for the image processing, the provisional PSF is preferably closer to the true PSF. However, even when the provisional PSF is largely different from the true PSF, the restoration may be realized by a process which will be described later.

The initial image setting section 224 retrieves the degraded image 100 from the memory 240 or a unshown storage medium and, meanwhile, sets a provisional restored image that is necessary in a PSF estimation process which will be described later. In the first cycle of the process, the provisional restored image is produced from the provisional PSF and the degraded image 100. In the second and subsequent cycles of the process, the image restored in the immediately previous cycle is set as the provisional restored image. The method of repairing the degraded image 100 with the use of the provisional PSF may be a known non-blind deconvolution method, such as the Wiener filtering method and the Richardson-Lucy (RL) method. Alternatively, the blind-deconvolution method such as disclosed in Non-patent Document 1 may be used. The provisional restored image may be produced by the initial image setting section 224 in the first cycle of the process. Alternatively, it may be produced by any other device and stored beforehand in the memory 240 or an unshown storage medium.

The image block selection section 226 randomly extracts a plurality of image block pairs from respective one of the degraded image 100 and the provisional restored image, each of the image block pairs being formed by an image block extracted from the degraded image 100 and an image block extracted from the provisional restored image which are at identical coordinates. The size of the image block is set to a size which is larger than the size of the provisional PSF and than the size of the estimated PSF. In the present embodiment, the dimensions of the image block along the X direction and the Y direction are adjusted to the larger one of the dimensions along the X direction and the Y direction of the provisional PSF or the PSF estimated at the immediately-previous step. For example, when the size of the degraded image is 1000×1000 pixels and pixels of the provisional PSF or the estimated PSF which have finite pixel values (values greater than 0) are all included in 50×100 pixels, each of the extracted image blocks has a rectangular region of 100×100 pixels. Note that, when the image block is unduly small, the proportion of image blocks which do not include an edge portion at which blur is readily distinguishable (a portion at which the brightness spatially largely changes) increases. In such image blocks, it cannot be determined whether the change in brightness is attributed to blur or texture (pattern), it is difficult to estimate a PSF which is close to the true PSF. Therefore, when the size of the PSF is unduly small (e.g., 30×30 pixels or smaller), the size of the image blocks is preferably not less than three to five times the size of the PSF. Note that, although in the present embodiment the respective image blocks have equal sizes, the process can be realized even when the respective image blocks have different sizes.

As the number of image blocks increases, the probability that a PSF which is close to the true PSF is successfully estimated also increases. Accordingly, the amount of computation and the amount of memory space which are necessary for the PSF estimation also increase. The number of the extracted image block pairs may be set arbitrarily depending on the computational resources. In an example of the present embodiment discussed herein, the number of extracted image block pairs is (Total Number of Pixels of Degraded Image)/(Number of Pixels of One Pixel Block). Note that the image block pairs are randomly selected herein but may alternatively be selected according to a predetermined criterion. For example, since an image block for which a PSF is estimated not to be close to the true PSF becomes known in the PSF estimation section 228 which will be described later, such a block and its neighboring blocks may be omitted before its random selection in the second and subsequent cycles. To select a PSF which is close to the true PSF, the image block pairs are preferably selected from, particularly, a portion which includes an edge. Specifically, a known filter, such as a Sobel filter or a Prewitt filter, may be used to calculate the edge of each image block before the image block pairs are selected based on the calculated edge intensity. For example, from among the plurality of randomly-selected image blocks, only image blocks may be selected in which the edge intensity is not less than a predetermined value in 50% or more of the pixels.

The image block selection section 226 also extracts a plurality of image blocks from the degraded image 100 for evaluation of the PSF. These image blocks (degraded image blocks) are used for selection of the candidate PSF from among the plurality of PSFs in the PSF selection section 230 which will be described later. These degraded image blocks can be extracted independently of the above-described image block pairs for the PSF estimation. Note that, from the viewpoint of reducing the amount of computation and the amount of memory space, the image blocks selected for the above-described PSF estimation may also be used for selection of the candidate PSF. To effectively perform an evaluation in the PSF selection section 230 which will be described later, the size of the image blocks for evaluation and the site from which these image blocks are selected are preferably different from those in the selection of the above-described image block pairs. However, the process is possible even when the size and the site are the same. Note that the degraded image blocks may be randomly selected. Alternatively, the degraded image blocks may be selected according to a predetermined criterion as in the selection of the image block pairs. Also, it is particularly preferable that the degraded image blocks are selected from a site which includes an edge. The number of the degraded image blocks may be arbitrarily set depending on the computational resources as in setting the number of the above-described image block pairs.

The PSF estimation section 228 estimates the PSF based on each of the plurality of image block pairs selected by the image block selection section 226. The estimation method may be a known blind-deconvolution method. For example, the PSF can be estimated according to the sparse coding disclosed in Non-patent Document 1, for example.

From among the plurality of PSFs estimated by the PSF estimation section 228, the PSF selection section 230 selects a PSF which is estimated to be close to the true PSF as the candidate PSF. The details of the selection of the candidate PSF will be described in a later section.

The image restoration section 232 performs a restoration process on the degraded image 100 using the selected candidate PSF. The restoration process performed herein is realized according to a known restoration method as in the restoration process performed in the initial image setting section 224. Note that, in the present embodiment, the image restoration section 232 and the initial image setting section 224 are realized by different function blocks. These functions may be realized by a single functional section.

The convergence determination section 234 compares an image restored by the image restoration section 232 with the provisional restored image. If the difference between the images is smaller than a predetermined threshold, the convergence determination section 234 determines that the restoration process has converged and outputs that image as the restored image 120. If the difference is equal to or greater than the threshold, that image is input to the initial image setting section 224 and set as a new provisional restored image.

Figure 4:
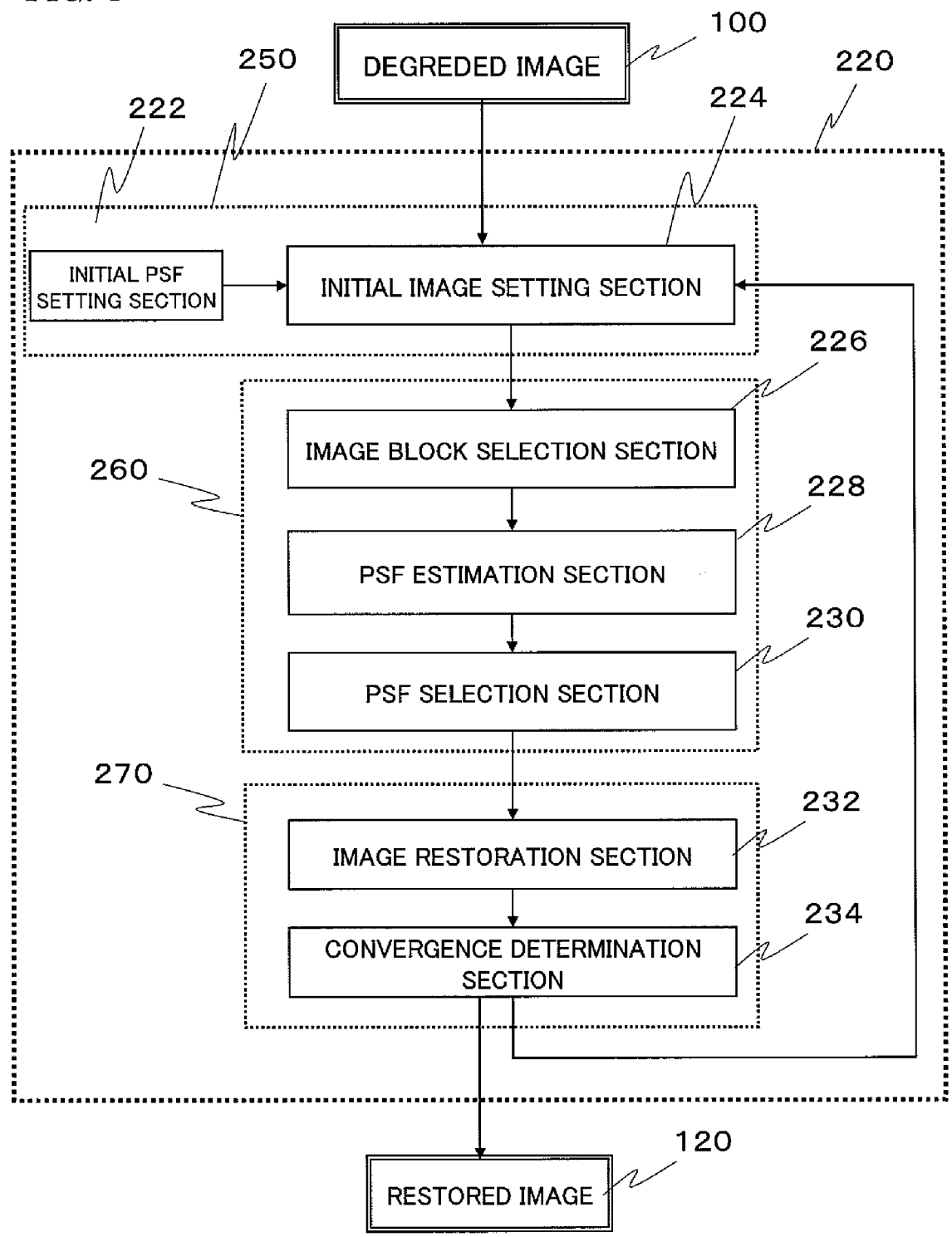
FIG. 4 is a block diagram showing a functional configuration of the image processing device in the first embodiment of the present invention.

The configuration shown in FIG. 4 is an example of the function block of the image processing section 220. The image processing section 220 may be divided into other function blocks. Each of the function blocks may be realized by separate hardware or may also be preferably realized by, for example, incorporating image processing software for execution of the above process into known hardware.

Next, the flow of the restoration process is described with reference to FIG. 5.

First, the initial image setting section 224 retrieves a degraded image 100 which is the subject of the restoration process from, for example, the memory 240 (S502). Then, the initial PSF setting section 222 retrieves an initial PSF from, for example, the memory 240 (S504). The initial image setting section 224 uses the retrieved degraded image 100 and the retrieved initial PSF to produce a provisional restored image (S506). Note that the setting of the initial PSF and the retrieval of the degraded image may be performed in the reversed order or may be concurrently performed.

Then, the image block selection section 226 selects a plurality of image block pairs from the degraded image 100 and the provisional restored image (S508). The PSF estimation section estimates a PSF from each of the plurality of estimated image block pairs (S510). Then, the PSF setting section 230 selects, from among the estimated PSFs, a PSF which is estimated to be close to the true PSF, and assigns the selected PSF as the candidate PSF (S512).

Hereinafter, details of the selection of image blocks (S508), the estimation of PSF in each image block (S510), and the selection of the candidate PSF (S512) are described with reference to FIG. 6 and FIG. 7.

Figure 6:
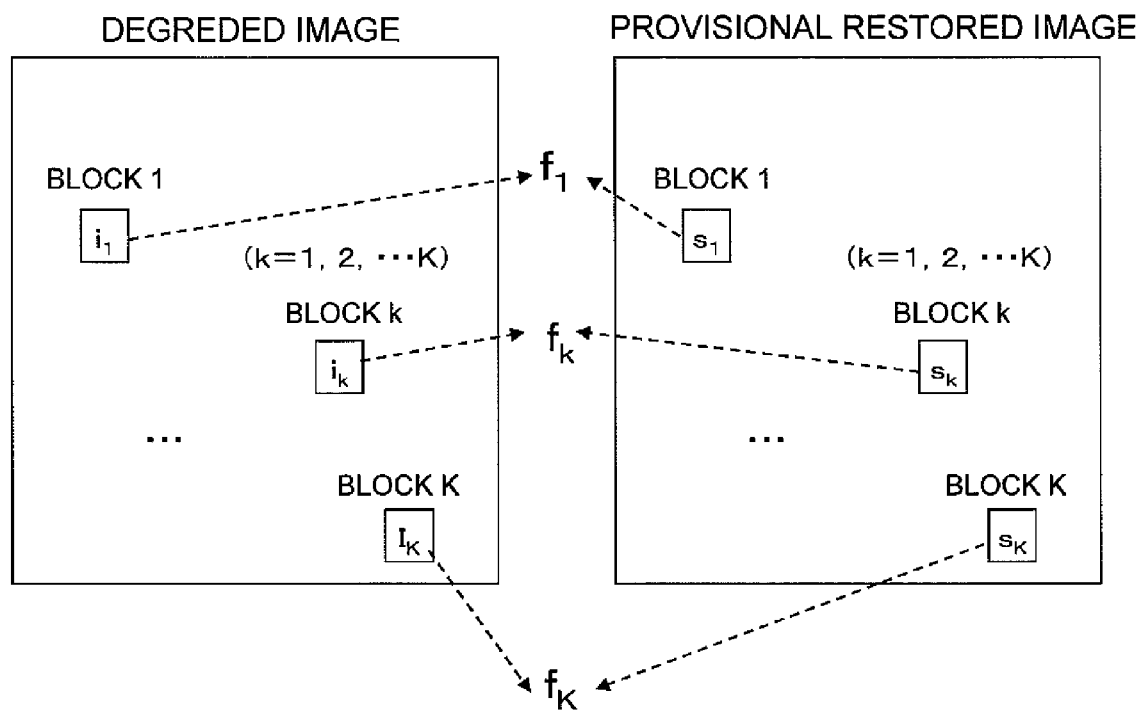
FIG. 6 is a concept diagram which illustrates a PSF estimation method in the first embodiment of the present invention.
Figure 7:
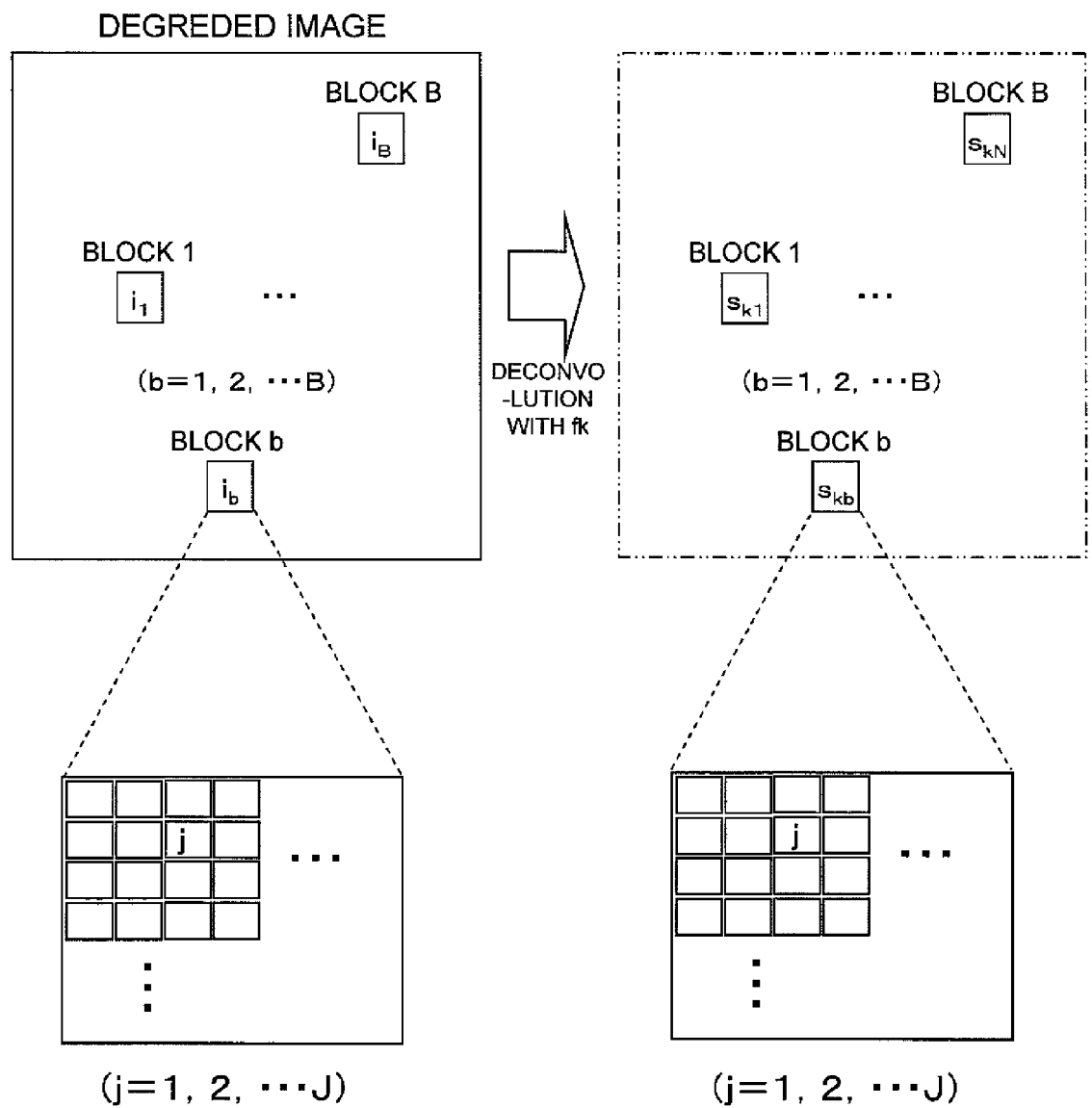
FIG. 7 is a concept diagram which illustrates a PSF evaluation method in the first embodiment of the present invention.

FIG. 6 is a diagram which schematically illustrates the selection of image blocks and the estimation of PSF in each image block. The image block selection section 226 selects a plurality of image block pairs from the degraded image and the provisional restored image. As shown in the diagram, the number of selected image block pairs is K (K is an integer not less than 2). The function that represents the $k^{th}$ one of the image blocks selected from the degraded image is expressed as $i_k$ (k=1, 2, ..., K). The function that represents the $k^{th}$ one of the image blocks selected from the provisional restored image is expressed as $s_k$ (k=1, 2, ..., K). From $i_k$ and $s_k$, the PSF of the $k^{th}$ image block, $f_k$, is estimated using a known PSF estimation method. As a result, K PSFs ($f_1$, $f_2$, ..., $f_K$) are obtained from K image block pairs.

Here, as an example, a PSF estimation method which is based on the method disclosed in Non-patent Document 1 is described. The PSF, $f_k$, is determined such that the right side of Eq. 6 shown below is minimized (optimization of $f_k$).

[Expression 6]

$$E(f_k) = \left( \sum_{\partial^* \in \Theta} w_{k(\partial^*)} \|\partial^* s_k * f_k - \partial^* i_k\|_2^2 \right) + \|f_k\|_1 \quad (6)$$

The first term of the right side of Eq. 6 serves as a reference for evaluation which represents whether or not the convolution of the restored image block $s_k$ and the PSF $f_k$ is close to the degraded image block $i_k$. Variable $w_k$ is the "weight" that is manually set. $\Theta$ is a set of operators which define what differentiation is to be performed on the image. Specifically, the set of operators includes six differential parameters in total, the zeroth-order differential, the first-order differentials (a differential which is differentiated once for the x direction and a differential which is differentiated once for the y direction), and the second-order differentials (a differential which is differentiated twice for the x direction, a differential which is differentiated twice for the y direction, and a differential which is differentiated once for the x direction and once for y direction). d* is a differential operator. An expression of Θ with the use of d* is Θ={d⁰, d_x, d_y, d_xx, d_xy, d_yy}. d* enables a process which uses both the brightness data and the edge data. It is therefore possible to obtain data which would not be obtained only with the brightness. The second term of the right side of Eq. 6 is one norm of $f_k$. This term is based on the sparse coding. This optimization term is used because large part of the elements in the matrix which represents $f_k$ are zero (inactive). In the present embodiment, the optimization is performed according to the "interior point method" as in Non-patent Document 1, whereby the total optimization can be realized. A specific calculation method for the optimization of $f_k$ is disclosed in Non-patent Document 1.

Next, details of the selection of the candidate PSF (S512) are described with reference to FIG. 7.

After the PSF estimation section 228 obtains $f_k$ for each of the image block pairs, the image block selection section 226 selects a plurality of image blocks for evaluation (degraded image blocks) from the degraded image 100. As shown in FIG. 7, the number of selected degraded image blocks is B (B is an integer not less than 2). The function that represents the $b^{th}$ one of the degraded image blocks is expressed as $i_b$ (b=1, 2, ..., B). The PSF selection section 230 performs convolution of $f_k$ and the degraded image block $i_b$ to obtain a function $s_{kb}$ that represents a restored image block. As a result, for each of the K PSFs, B restored image blocks are produced. The PSF selection section 230 further performs convolution of the restored image block $s_{kb}$ and $f_k$ and evaluates each PSF based on the error between the result $s_{kb}*f_k$ and the degraded image block $i_b$.

Hereinafter, a PSF evaluation method which is based on the error is described. Suppose that one degraded image block includes J pixels. The value of the $j^{th}$ pixel in the degraded image block $i_b$ is expressed as $i_{bj}$ (j=1, 2, ..., J). The value of the $j^{th}$ pixel in an image obtained by convolution of the restored image block $s_{kb}$ and $f_k$ is expressed as $(s_{kb}*f_k)_j$ (j=1, 2, ..., J). In the present embodiment, the square error between $(s_{kb}*f_k)$ and $i_b$ is defined as $\Delta_{kb}$. The candidate PSF is selected based on the number of image blocks in which the square error $\Delta_{kb}$ is equal to or smaller than a predetermined threshold t. For example, a point spread function $f_k$ for which the number of image blocks that satisfy Eq. 7 shown below is the largest is selected as the candidate PSF.

[Expression 7]

$$\Delta_{kb} \equiv \sum_j |(s_{kb}*f_k)_j - i_{bj}|^2 \le t \quad (7)$$

This evaluation method is based on RANSAC (Random Sample Consensus). According to this evaluation method, from the PSFs estimated from a plurality of image block pairs, PSFs estimated from image block pairs which include noise or blur of a subject are excluded because they have large errors. Since any of PSFs estimated from image block pairs which have relatively small noise or blur of a subject is selected as the candidate PSF, a PSF which is close to the true PSF can be estimated even when the image includes noise or blur of a subject.

In the present embodiment, the candidate PSF is not necessarily be a PSF ($f_k$) for which the number of image blocks that satisfy Eq. 7 is the largest. For example, any one of PSFs ($f_k$) for which the number of image blocks that satisfy Eq. 7 is larger than a predetermined threshold may be selected as the candidate PSF. In the present embodiment, one of a plurality of estimated PSFs is selected as the candidate PSF, but the present invention is not limited to this mode of selection. For example, some of a plurality of PSFs (e.g., about 5% of the number of image block pairs) may be selected based on Eq. 7, and the average of the selected PSFs may be assigned as the candidate PSF.

After the candidate PSF is selected, the image restoration section 232 performs a restoration process on the degraded image 100 using the candidate PSF (S514). The restoration process may be realized by a known method, such as the Richardson-Lucy (LR) method, the Wiener filtering method, or the like.

The convergence determination section 234 compares the restored image with the provisional restored image to determine whether or not the restoration process has converged (S518). The determination as to whether or not the restoration process has converged is made based on predetermined criterion. For example, it can be determined that the restoration process has converged when the average of errors in respective pixels between the restored image and the provisional restored image (the absolute value of the difference in pixel value/the total number of pixels) is 0.0001. If it is determined that the restoration process has converged, the restored image is output as the final restored image 120 (S520). If it is determined that the restoration process has not yet converged, the restored image is set as a new provisional restored image in the initial image setting section 224 (S519), and the processes from S508 to S518 are performed again.

As described above, the image processing device 200 of the present embodiment repeatedly performs the restoration process based on an input degraded image 100 and outputs a restored image 120 which is close to a true image (ideal image). In the course of the restoration, a plurality of image blocks are selected, and estimation and evaluation of the PSF are performed on each one of the image blocks, whereby the candidate PSF is selected. Since the calculation is performed on each one of the image blocks that have small sizes, the image processing device 200 of the present embodiment is capable of reducing the amount of computation and the amount of memory space as compared with the prior art. Also, since the candidate PSF is selected based on RANSAC, a PSF which is close to the true PSF can be selected without being disturbed by local noise or blur of a subject.

Hereinafter, how much the amount of computation and the amount of memory space which are required for the restoration process in the image processing device 200 of the present embodiment are improved as compared with the prior art is described. Where the number of pixels in an image is N, the number of pixels included in each of the image blocks used for the PSF estimation is n, and the number of repetitions of the restoration process is m, the amount of computation in the present embodiment is $O(m \times n^2)$, while the amount of computation in the prior art is $O(N^2)$. In an example where $N=10^6$, $n=10^4$, and $m=10^2$, the amount of computation which is required when the prior art is used is $O(10^{12})$, while the amount of computation which is required in the present embodiment is $O(10^{10})$, so that the amount of computation is reduced to about a 1/100. On the other hand, as for the amount of memory space, a temporary storage region used for the restoration operation is approximately proportional to N in the prior art but is approximately proportional to n in the present embodiment. Therefore, the amount of required memory space decreases in proportion to n/N. When $N=10^6$ and $n=10^4$, the amount of required memory space decreases to about 1/100.

In the above description, the image processing device 200 is described as a single unit device, although the image processing device 200 can be realized in various forms. For example, a program which is stored in a storage medium, such as a CD-ROM, a flash memory, or the like, or distributed through an electric communication line, and which enables implementation of the above-described restoration process, is carried out on a suitable computer, such that the computer works as the image processing device 200.

In this specification, the pixel value of the degraded image, $i(x,y)$, and the pixel value of the restored image, $s(x, y)$, represent the brightness values at the coordinates $(x, y)$. Here, the "brightness" refers not only to the strength of a so-called brightness signal but also to the signal strength of any of RGB color components or the sum of the signal strengths of the RGB color components. When the image processing device of the present embodiment is used for the restoration process of an image obtained by an X-ray camera or an infrared camera, the "brightness" may refer to the signal strength of X-ray or infrared light.

Embodiment 2

Next, the second embodiment of the present invention is described with reference to FIG. 8. The image processing device of the present embodiment is different from the image processing device of Embodiment 1 only in the method of selecting the candidate PSF in the PSF selection section 230, and the other features are common among Embodiments 1 and 2. Therefore, the features which are common among the image processing device of the present embodiment and the image processing device of Embodiment 1 are not described in this section, while only the differences are described.

Figure 5:
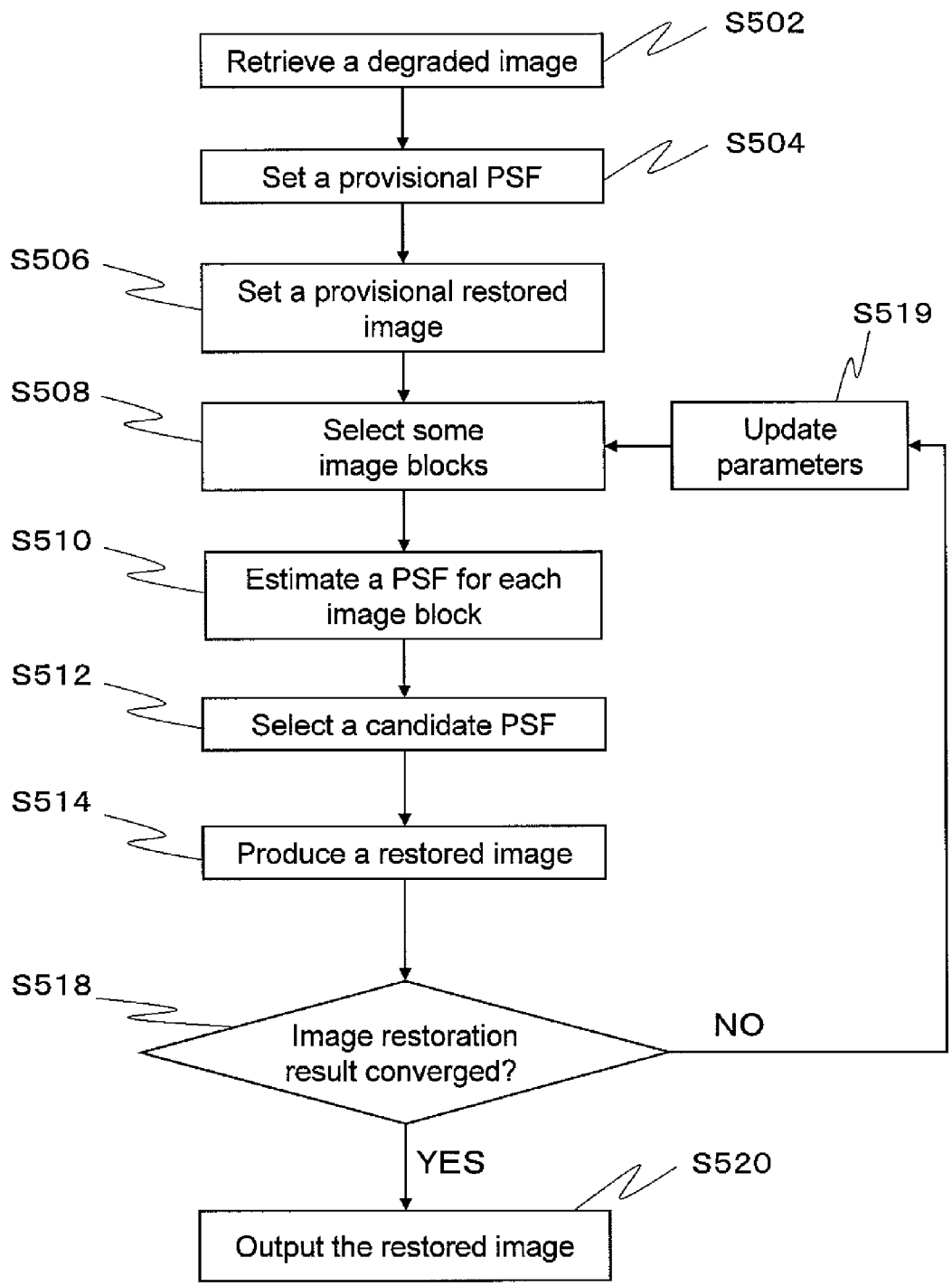
FIG. 5 is a flowchart showing a process flow of the image processing device in the first embodiment of the present invention.

The difference between the image processing device of the present embodiment and the image processing device of Embodiment 1 is that, in step S512 of FIG. 5, the image blocks for evaluation are selected not only from the degraded image but also from the provisional restored image. In step S508 shown in FIG. 5, the PSF estimation section 228 obtains $f_k$ ($k=1, 2, \ldots, K$) for each of the image block pairs, and the image block selection section 226 selects a plurality of image block pairs for evaluation from the degraded image 100 and the provisional restored image, each of the image block pairs being formed by an image block extracted from the degraded image 100 and an image block extracted from the provisional restored image which are at identical coordinates. Hereinafter, among the image block pairs for evaluation, image blocks extracted from the degraded image are referred to as "degraded image blocks", and image blocks extracted from the provisional restored image are referred to as "restored image blocks".

Figure 8:
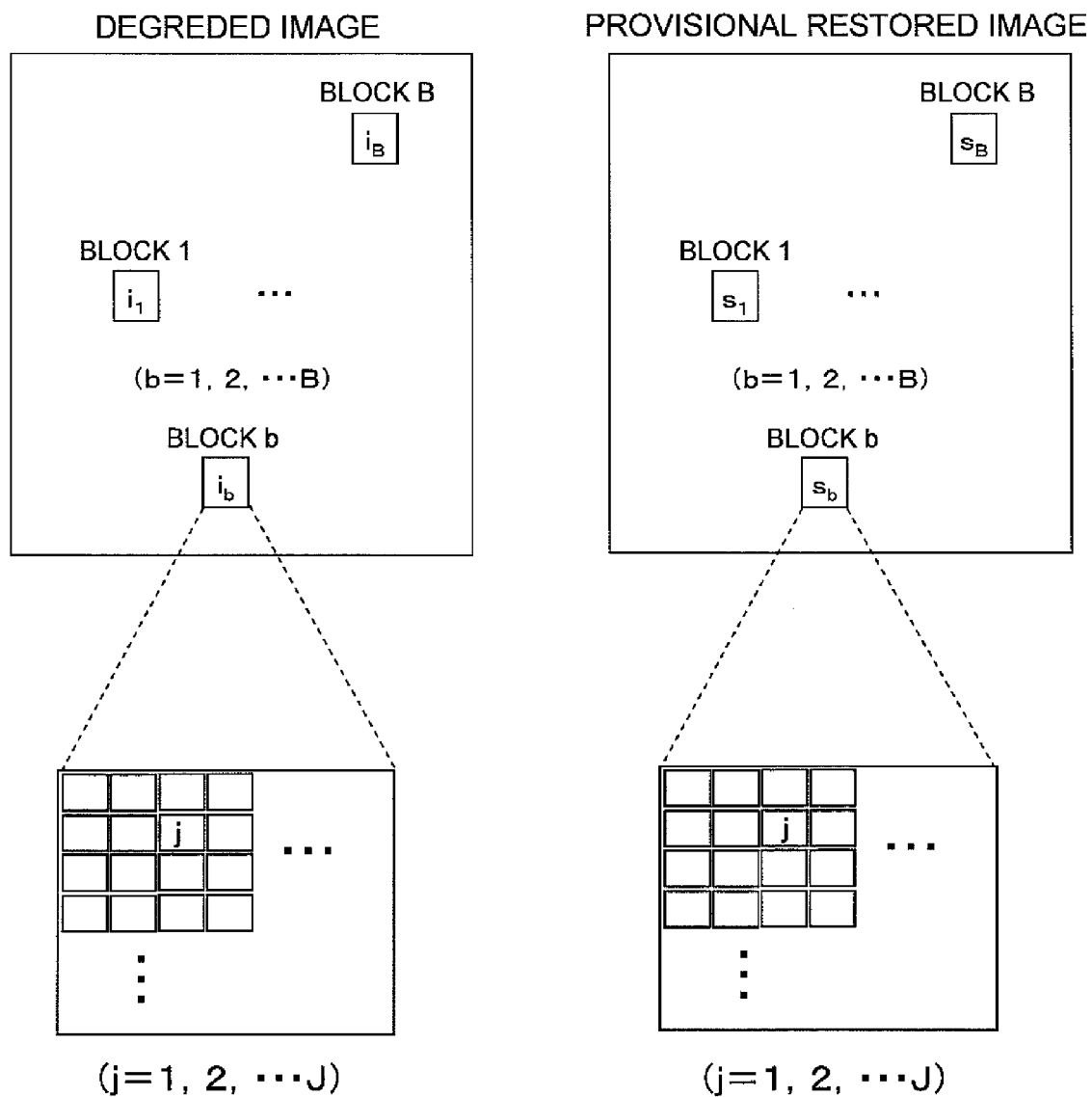
FIG. 8 is a concept diagram which illustrates a PSF evaluation method in the second embodiment of the present invention.

As shown in FIG. 8, the number of image block pairs selected for evaluation is B (B is an integer not less than 2). The function that represents the $b^{th}$ one of the degraded image blocks is expressed as $i_b$ ($b=1, 2, \ldots, B$). Likewise, the function that represents the $b^{th}$ one of the restored image blocks is expressed as $s_b$ ($b=1, 2, \ldots, B$). The PSF selection section 230 performs convolution of $f_k$ and the restored image block $s_b$ and evaluates each PSF based on the error between the result $s_b * f_k$ and the degraded image block $i_b$.

The error-based PSF evaluation method of the present embodiment is the same as the evaluation method of Embodiment 1. The value of the $j^{th}$ pixel in the degraded image block $i_b$ is expressed as $i_{bj}$ ($j=1, 2, \ldots, J$). The value of the $j^{th}$ pixel in an image obtained by convolution of the restored image block $s_b$ and $f_k$ is expressed as $(s_b * f_k)j$ ($j=1, 2, \ldots, J$). For example, a PSF ($f_k$) for which the number of image blocks that satisfy Eq. 8 shown below is the largest is selected as the candidate PSF.

[Expression 8]

$$\Delta_{kb} \equiv \sum_j |(s_b * f_k)_j - i_{bj}|^2 \leq t \quad (8)$$

where t is a predetermined threshold.

In this evaluation method, PSFs estimated from image block pairs which include noise or blur of a subject are also excluded in the same manner as in the evaluation method of Embodiment 1. Since only a PSF estimated from an image block pair which has relatively small noise or blur of a subject is selected as the candidate PSF, a PSF which is close to the true PSF can be estimated even when the image includes noise or blur of a subject.

In the present embodiment also, the candidate PSF is not necessarily be a PSF ($f_k$) for which the number of image blocks that satisfy Eq. 8 is the largest. For example, any one of PSFs (fk) for which the number of image blocks that satisfy Eq. 8 is larger than a predetermined threshold may be selected as the candidate PSF. In the present embodiment, one of a plurality of estimated PSFs is selected as the candidate PSF, but the present invention is not limited to this mode of selection. For example, some of a plurality of PSFs (e.g., about 5% of the number of image block pairs) may be selected based on Eq. 7, and the average of the selected PSFs may be assigned as the candidate PSF.

Embodiment 3

Next, the third embodiment of the present invention is described. The image processing device of the present embodiment is different from the image processing devices of Embodiments 1 and 2 only in the method of selecting the candidate PSF in the PSF selection section 230, and the other features are common among Embodiments 1 to 3. Therefore, the features which are common among the image processing device of the present embodiment and the image processing devices of Embodiments 1 and 2 are not described in this section, while only the differences are described.

The different between the image processing device of the present embodiment and the image processing device of Embodiment 1 is that, in step S512 of FIG. 5, the image blocks for evaluation are selected not only from the degraded image but also from the provisional restored image. In the present embodiment, in step S512 of FIG. 5, the PSF selection section 230 sorts a plurality of estimated PSFs into a plurality of clusters based on their similarity to one another, before selecting the candidate PSF from one of the clusters which is estimated to include a PSF which is close to the true PSF. This mode of selection enables reduction of the amount of computation.

Figure 9:
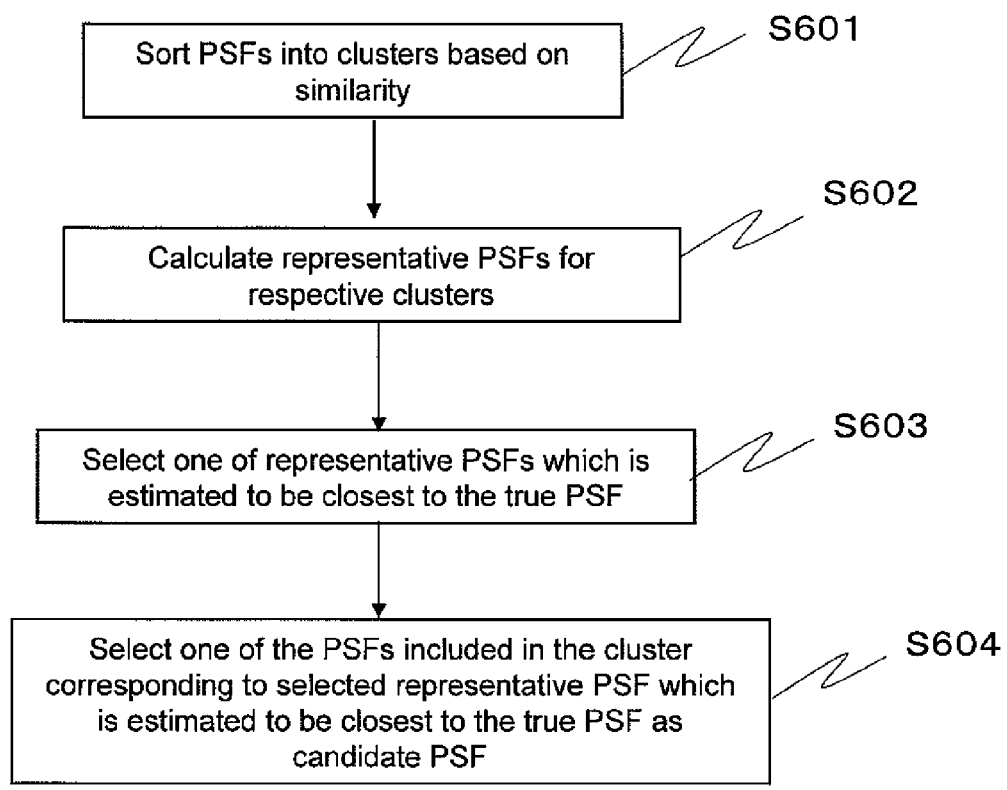
FIG. 9 is a flowchart showing a process flow of a PSF selection section in the third embodiment of the present invention.

FIG. 9 is a flowchart which illustrates the flow of the process performed by the PSF selection section 230 of the present embodiment in step S512. The PSF selection section 230 first sorts a plurality of PSFs ($f_1, f_2, \ldots, f_K$) into a plurality of clusters based on their similarity to one another (S601). Then, for each of the clusters, an average PSF in that cluster (representative PSF) is calculated (S602). Then, from among the plurality of calculated representative PSFs, one representative PSF which is estimated to be closest to the true PSF is selected (S603). In the last, from the cluster corresponding to the selected representative PSF, a PSF which is estimated to be closest to the true PSF is selected as the candidate PSF (S604).

Hereinafter, the processes in the respective steps are described in more detail.

Figure 10:
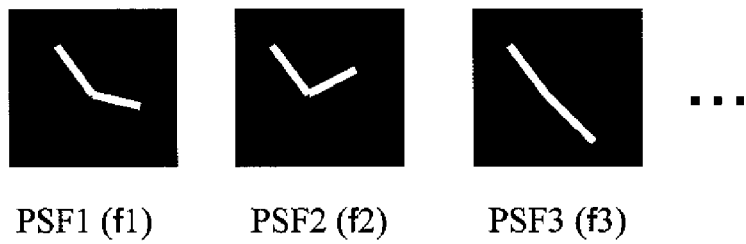
FIG. 10 is a concept diagram which illustrates PSF clusters in the third embodiment of the present invention.
Figure 10:
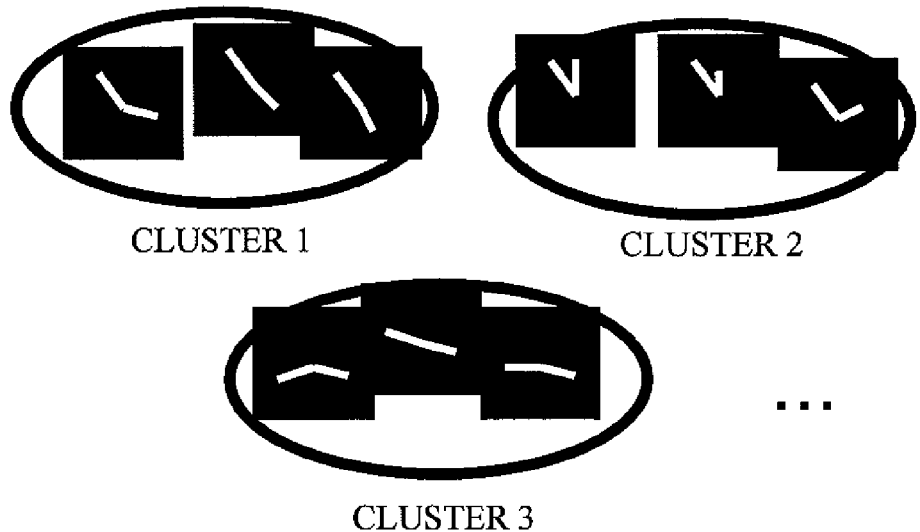
Figure 10:
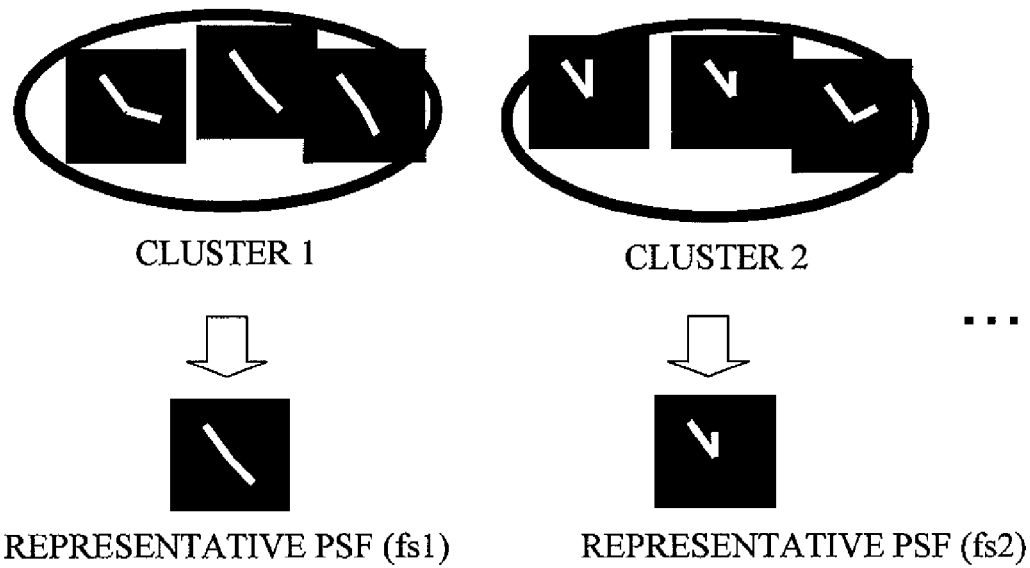

FIG. 10 is a concept diagram which schematically shows the process in the present embodiment. FIG. 10(a) shows an example of a plurality of PSFs ($f_1, f_2, \ldots, f_K$) calculated in step S510. In step S601, the PSF selection section 230 sorts these PSFs into a plurality of clusters as shown in FIG. 10(b).

The sorting into the plurality of clusters is carried out, for example, according to the following procedures. First, two out of the plurality of PSFs are selected from $_KC_2$ combinations. Then, the absolute value of the difference between the selected two PSFs (L1 norm), $\Delta f$, is calculated. The selected two PSFs are represented by $f_{k1}$ and $f_{k2}$. When they are assumed as being images, the brightness values of the jth pixels are expressed as $(f_{k1})_j$ and $(f_{k2})_j$. In that case, $\Delta f$ is expressed by Eq. 9 shown below.

[Expression 9]

$$\Delta f = \sum_j |(f_{k1})_j - (f_{k2})_j| \qquad (9)$$

If $\Delta f$ is smaller than a predetermined threshold ft, the PSF selection section 230 sorts the two PSFs into the same cluster. If $\Delta f$ is equal to or greater than the threshold ft, the PSF selection section 230 sorts the two PSFs into different clusters. This process is performed on any combinations of two PSFs, whereby the plurality of PSFs can be sorted into a plurality of clusters based on their similarity to one another.

In step S602, the PSF selection section 230 determines representative PSFs for respective ones of the plurality of clusters of the sorted PSFs. The representative PSF of each cluster can be determined by calculating the average value of all the PSFs included in that cluster. Note that the representative PSF may be determined by calculating the central value rather than the average value. FIG. 10(c) shows an example of the thus-determined representative PSF ($f_{s1}, f_{s2}, \ldots, f_{sK}$).

In the subsequent step S603, from among the plurality of representative PSFs, the PSF selection section 230 selects a PSF which is estimated to be closest to the true PSF. The selection method is similar to the candidate PSF selection method that is based on Eq. 7 of Embodiment 1 or Eq. 8 of Embodiment 2.

Then, in step S604, the PSF selection section 230 selects, as the candidate PSF, one of a plurality of PSFs included in the cluster corresponding to the selected representative PSF which is estimated to be closest to the true PSF. The selection method of the candidate PSF may be realized by the method of Embodiment 1 or 2.

According to the present embodiment, a group (cluster) of PSFs which are estimated to be close to the true PSF is first specified, rather than performing the determination expressed by Eq. 7 or Eq. 8 on all the PSFs estimated by the PSF estimation section 228, and then, relatively small number of PSFs included in that cluster are subjected to the determination expressed by Eq. 7 or Eq. 8. The process of sorting into the clusters is a difference operation and therefore requires a smaller amount of computation than the convolution of Eq.e 7 and 8. Therefore, the amount of computation required for the entire process can be reduced.

Embodiment 4

Next, the fourth embodiment of the present invention is described with reference to FIG. 11. The present embodiment relates to an image capture device which includes the image processing device of Embodiment 1. Therefore, the features which are common among the present embodiment and Embodiment 1 are not described in this section, while only the differences are described.

Figure 11:
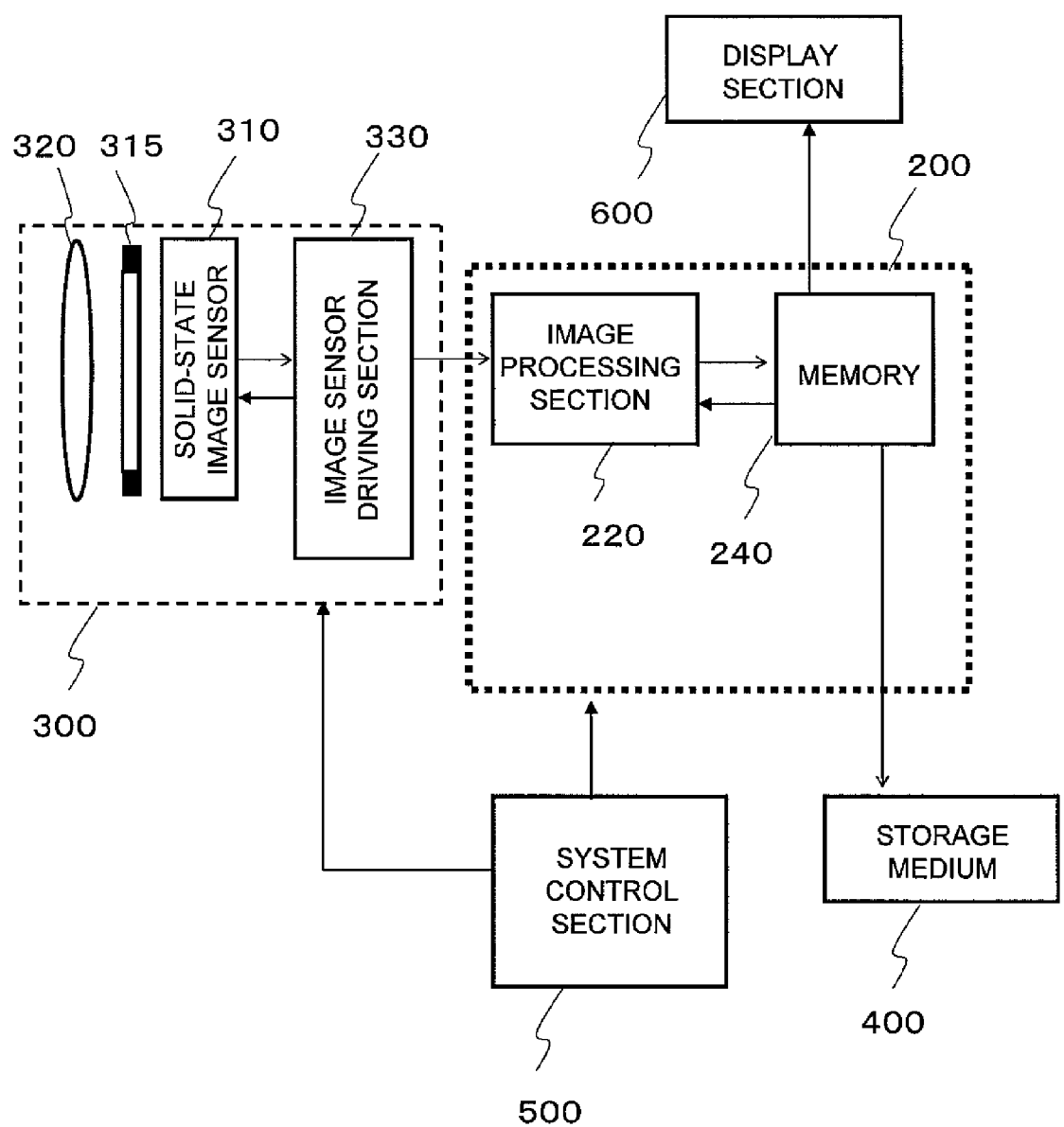
FIG. 11 is a diagram showing a general configuration of an image capture device in the fourth embodiment of the present invention.

FIG. 11 is a block diagram showing a general configuration of the image capture device of the present embodiment. The image capture device of the present embodiment is a digital electronic camera, but the present invention is not limited to this example. The image capture device of the present embodiment includes, as illustrated in FIG. 11, an image capture section 300, an image processing device 200 for performing various signal processing and restoration of an image, a captured image display section 600 for displaying an image obtained by image capturing, a storage section 400 for storing data of the image, and a system control section 500 for controlling respective sections. A major difference of the image capture device of the present embodiment from known image capture devices is the operation of the image processing device 200.

The image capture section 300 of the present embodiment includes a solid-state image sensor (image sensor) 310 that has a plurality of photosensitive cells (photodiodes) arranged over an imaging area, a shutter 315 which has the function of a lens stop, and a photography lens 320 for forming an image on the imaging area of the solid-state image sensor 310. A typical example of the solid-state image sensor 310 is a CCD or a CMOS sensor. The photography lens 320 has a known configuration and may be, in actuality, a lens unit which is formed by a plurality of lenses. The shutter 315 and the photography lens 320 are driven by an unshown mechanism to perform operations which are necessary for optical zooming, Auto Exposure (AE) and Auto Focus (AF).

The image capture section 300 further includes an image sensor driving section 330 for driving the solid-state image sensor 310. The image sensor driving section 330 may be realized by, for example, a semiconductor integrated circuit, such as a CCD driver. The image sensor driving section 330 drives the solid-state image sensor 310 to read out an analog signal (photoelectrically converted signal) from the solid-state image sensor 310 and convert the analog signal to a digital signal.

The image processing device 200 of the present embodiment includes an image processing section (image processor) 220 and a memory 240. The signal processing section 200 is coupled to a display section 300, such as a liquid crystal display panel, and a storage medium 400, such as a memory card.

The image processing section 220 performs various signal processing, such as color tone correction, change of resolution, and data compression, as well as the inventive restoration process on a degraded image. The image processing section 220 is preferably realized by a combination of hardware, such as a known digital signal processor (DSP), and software for execution of image processing. The memory 240 may be formed by a DRAM or the like. The memory 240 stores image data obtained from the image capture section 300 and, meanwhile, temporarily stores image data which have undergone various image processing or image data which have been compressed in the image processing section 220. The image data are converted to analog signals and thereafter displayed in the display section 300. Alternatively, the image data which remain in the form of digital signals are stored in the storage medium 400. The image data may be transmitted to another apparatus (not shown) via an unshown wireless or wired communication device.

The above components are controlled by the system control section 500 that includes an unshown central processing unit (CPU) and a flash memory. Note that the image capture device of the present embodiment may include other known components, such as an optical viewfinder, a power source (battery), and a flashlight. However, descriptions of such components are not particularly necessary for understanding of the present invention and are therefore omitted.

The above configuration is merely an example. The image capture device of the present embodiment may have any configuration so long as a degraded image obtained by the solid-state image sensor 310 is input to the image processing device 200.

When a subject is photographed by a user using the image capture device of the present embodiment, the solid-state image sensor 310 of the image capture section 300 obtains a signal which is produced according to an image formed on the imaging area. The image processing device 200 receives the signal obtained by the solid-state image sensor 310. The thus-obtained image is a degraded image which is expressed by i(x,y) on the left side of Eq. 7. In the image processing device 200, the image processing section 220 performs a process to restore s(x,y) based on i(x,y). The flow of this restoration process is the same as the flow of the restoration process shown in FIG. 5. The restored image s(x,y) obtained by the restoration process is displayed by the display section 600.

In the image capture device of the present embodiment, the image processing device 200 repeatedly performs the restoration process based on a degraded image obtained by the solid-state image sensor 310 and outputs a restored image which is close to the true image (ideal image). In the course of the restoration, a plurality of image blocks are selected, and estimation and evaluation of the PSF are performed on each one of the image blocks, whereby the candidate PSF is selected. Since the calculation is performed on each one of the image blocks that have small sizes, the image capture device of the present embodiment is capable of a high-speed restoration process as compared with a prior-art image capture device which performs an image restoration process. Also, since the candidate PSF is selected based on RANSAC, a restored image which is close to the true image can be obtained even when a photographed image includes local noise or blur of a subject.

In the present embodiment, the device of Embodiment 1 is used as the image processing device, but the present invention is not limited to this example. The device of Embodiment 2 or 3 may alternatively be used as the image processing device. Still alternatively, another image processing device of the present invention may be used.

INDUSTRIAL APPLICABILITY

According to the present invention, the process time which is required for restoration of an image can be reduced while the restoration accuracy is maintained. Therefore, the present invention is suitably applicable to an image processing device, an image capture device which has an image processing function, and the like.

REFERENCE SIGNS LIST 100 degraded image
120 restored image
130 image
135 pixels
200 image processing device
220 image processing section
222 initial PSF setting section
224 initial image setting section
226 image block selection section
228 PSF estimation section
230 PSF selection section
232 image restoration section
234 parameter update section
240 memory
250 image input section
260 PSF determination section
270 restoration section
300 image capture section
310 solid-state image sensor
320 photography lens
315 shutter with lens stop function
330 image sensor driving section
400 storage medium
500 system control section
600 display section

The invention claimed is:

1. An image processing device for producing a restored image from an input degraded image, the restored image having smaller blur than the degraded image, the device comprising:
    an initial image setting section that sets a provisional restored image;
    an image block selection section that selects a plurality of image block pairs from the degraded image and the provisional restored image, each of the image block pairs being formed by two image blocks at identical coordinates in the degraded image and the provisional restored image;
    a PSF estimation section that obtains a plurality of point spread functions respectively corresponding to the plurality of image block pairs;
    a PSF selection section that selects a candidate point spread function which defines blur of the degraded image from among the plurality of point spread functions obtained in PSF estimation section; and
    an image restoration section that produces a restored image from the degraded image using the candidate point spread function.

2. The image processing device of claim 1, further comprising an initial PSF setting section that sets a provisional point spread function,
    wherein the initial image setting section produces the provisional restored image from the degraded image using the provisional point spread function.

3. The image processing device of claim 2 wherein, where a horizontal direction and a vertical direction of the degraded image and the provisional restored image are respectively referred to as an X direction and a Y direction,
    each of a size along the X direction and a size along the Y direction of each of image blocks included in the plurality of image block pairs is equal to a larger one of a size along the X direction and a size along the Y direction of a region formed by pixels in which the provisional point spread function has a finite value.

4. The image processing device of claim 1, wherein the image block selection section randomly selects the plurality of image block pairs from the degraded image and the provisional restored image.

5. The image processing device of claim 1 wherein, where $n=1, 2, \ldots, N$ (N is an integer not less than 2), the provisional restored image is an $n^{th}$ provisional restored image, and the restored image is an $n^{th}$ restored image, after production of the $n^{th}$ restored image, the initial image setting section updates the $n^{th}$ provisional restored image with the $n^{th}$ restored image, the updated restored image being used as a $(n-1)^{th}$ provisional restored image, and the image block selection section selects, from the degraded image and the $(n+1)^{th}$ provisional restored image, another plurality of image block pairs at least some of which are different from said plurality of image block pairs, whereby updating of the candidate point spread function and the restored image is repeated.

6. The image processing device of claim 1, wherein the image block selection section selects, as a first image block group, a plurality of image blocks from the degraded image independently of the selection of the plurality of image block pairs, and the PSF selection section selects the candidate point spread function based on a difference between $(s_{kb}*f_k)$ and $i_b$, $(s_{kb}*f_k)$ being a function obtained by convolution of $s_{kb}$ and $f_k$, where $f_k$ is a $k^{th}$ point spread function among the plurality of point spread functions obtained by the PSF estimation section (k is an integer not less than 1), $i_b$ is a function which represents a brightness distribution in a $b^{th}$ one of the image blocks included in the first image block group (b is an integer not less than 1), and $s_{kb}$ is a function obtained by deconvolution of $i_b$ and $f_k$.

7. The image processing device of claim 6, wherein the PSF selection section calculates, for each of the plurality of point spread functions, a number of image blocks in which a square error between $(s_{kb}*f_k)$ and $i_b$ is not more than a predetermined threshold and selects one of the point spread functions for which the calculated number of the image blocks is the largest as the candidate point spread function.

8. The image processing device of claim 1, wherein the image block selection section selects, independently of the selection of the plurality of image block pairs, a plurality of image blocks from the degraded image as a first image block group and a plurality of image blocks from the provisional restored image as a second image block group, the image blocks of the second image block group being at coordinates identical to those of the image blocks included in the first image block group, and the PSF selection section selects the candidate point spread function based on a difference between $(s_b*f_k)$ and $i_b$, $(s_b*f_k)$ being a function obtained by convolution of $s_b$ and $f_k$, where $f_k$ is a $k^{th}$ point spread function among the plurality of point spread functions obtained by the PSF estimation section (k is an integer not less than 1), $i_b$ is a function which represents a brightness distribution in a $b^{th}$ one of the image blocks included in the first image block group (b is an integer not less than 1), and $s_b$ is a function which represents a brightness distribution in one of the image blocks included in the second image block group corresponding to the $i_b$ (b is an integer not less than 1).

9. The image processing device of claim 8, wherein the PSF selection section calculates, for each of the plurality of point spread functions, a number of image blocks in which a square error between $(s_b*f_k)$ and $i_b$ is not more than a predetermined threshold and selects one of the point spread functions for which the calculated number of the image blocks is the largest as the candidate point spread function.

10. The image processing device of claim 6, wherein the image block selection section randomly selects the first image block group from the degraded image.

11. The image processing device of any of claim 1, wherein the PSF selection section performs following processes:

sorting the plurality of point spread functions obtained by the PSF estimation section into a plurality of clusters, each of the clusters being formed by a plurality of point spread functions which are similar to one another, determining an average point spread function in each of the plurality of clusters as a representative PSF of the cluster, selecting a candidate representative PSF from among the plurality of determined representative PSFs, and selecting the candidate point spread function from one of the clusters corresponding to the candidate representative PSF.

12. An image capture device, comprising:

the image processing device of claim 1; and a solid-state image sensor, wherein a signal obtained by the solid-state image sensor is input as the degraded image to the image processing device.

13. A method of producing a restored image from an input degraded image, the restored image having smaller blur than the degraded image, the method comprising the steps of:

(A) setting an $n^{th}$ restored image where n=1, 2, ..., N (N is an integer not less than 2);

(B) selecting a plurality of image block pairs from the degraded image and the $n^{th}$ restored image, each of the image block pairs being formed by two image blocks at identical coordinates in the degraded image and the $n^{th}$ restored image;

(C) obtaining a plurality of point spread functions respectively corresponding to the plurality of image block pairs;

(D) selecting a candidate point spread function which defines blur of the degraded image from among the plurality of point spread functions obtained in the PSF estimation section; and (E) producing a $(n+1)^{th}$ restored image from the degraded image using the candidate point spread function, wherein respective ones of steps (A) to (E) are started from n=1 and repeated till a $N+1^{th}$ restored image is produced.

14. A non-transitory computer-readable storage medium that stores a program for controlling an operation of an image processing device that is configured to repeatedly perform a restoration process based on an input degraded image to produce a restored image, the restored image having smaller blur than the degraded image, the program comprising the steps of:

(A) setting an $n^{th}$ restored image where n=1, 2, ..., N (N is an integer not less than 2);

(B) selecting a plurality of image block pairs from the degraded image and the $n^{th}$ restored image, each of the image block pairs being formed by two image blocks at identical coordinates in the degraded image and the $n^{th}$ restored image;

(C) obtaining a plurality of point spread functions respectively corresponding to the plurality of image block pairs;

(D) selecting a candidate point spread function which defines blur of the degraded image from among the plurality of point spread functions obtained in the PSF estimation section; and (E) producing a $(n+1)^{th}$ restored image from the degraded image using the candidate point spread function, wherein the program instructs the image processing device to perform a process of starting respective ones of steps (A) to (E) from n=1 and repeating steps (A) to (E) till a N+1$^{th}$ restored image is produced.

* * * * *